(12) United States Patent
Lambert et al.

(10) Patent No.: US 10,327,318 B2
(45) Date of Patent: Jun. 18, 2019

(54) ADJUSTING A BEAM DIAMETER AND AN APERTURE ANGLE OF A LASER BEAM

(71) Applicant: TRUMPF Lasersystems for Semiconductor Manufacturing GmbH, Ditzingen (DE)

(72) Inventors: Martin Lambert, Ditzingen (DE); Tolga Ergin, Ditzingen (DE); Thomas Schwarzbaeck, Ditzingen (DE)

(73) Assignee: TRUMPF Lasersystems for Semiconductor Manufacturing GmbH, Ditzingen (DE)

(*) Notice: Subject to any disclaimer, the term of this patent is extended or adjusted under 35 U.S.C. 154(b) by 0 days.

(21) Appl. No.: 15/656,313

(22) Filed: Jul. 21, 2017

(65) Prior Publication Data

US 2017/0325325 A1 Nov. 9, 2017

Related U.S. Application Data

(63) Continuation of application No. PCT/EP2015/051099, filed on Jan. 21, 2015.

(51) Int. Cl.
| | |
|---|---|
| *G02B 7/182* | (2006.01) |
| *G02B 5/10* | (2006.01) |
| *H05G 2/00* | (2006.01) |
| *G02B 17/06* | (2006.01) |
| *G02B 27/09* | (2006.01) |

(Continued)

(52) U.S. Cl.
CPC .......... *H05G 2/008* (2013.01); *G02B 7/182* (2013.01); *G02B 17/0663* (2013.01);
(Continued)

(58) Field of Classification Search
CPC .......... G02B 5/08; G02B 5/0891; G02B 5/10; G02B 7/00; G02B 7/003; G02B 7/005;
(Continued)

(56) References Cited

U.S. PATENT DOCUMENTS 5,063,586 A * 11/1991 Jewell ................ B82Y 10/00
359/859
5,144,476 A * 9/1992 Kebo .................. G02B 15/00
359/366

(Continued)

FOREIGN PATENT DOCUMENTS

| EP | 1679538 B1 | 4/2008 |
| WO | WO2014048563 A1 | 4/2014 |

OTHER PUBLICATIONS

International Search Report for PCT Application No. PCT/EP2015/051099, dated Sep. 21, 2015, 4 pages.

(Continued)

*Primary Examiner* — Thong Q Nguyen
(74) *Attorney, Agent, or Firm* — Fish & Richardson P.C.

(57) ABSTRACT

Beam guiding devices for guiding a laser beam, in particular in a direction towards a target region for producing extreme ultraviolet (EUV) radiation, include an adjustment device for adjusting a beam diameter and an aperture angle of the laser beam. The adjustment device includes a first mirror having a first curved reflecting surface, a second mirror having a second curved reflecting surface, a third mirror having a third curved reflecting surface, a fourth mirror having a fourth curved reflecting surface, and a movement device configured to adjust the beam diameter and the aperture angle of the laser beam by moving the first reflecting surface and the fourth reflecting surface relative to one another and, independently thereof, moving the second reflecting surface and the third reflecting surface together relative to the first reflecting surface and the fourth reflecting surface.

20 Claims, 6 Drawing Sheets

(51) Int. Cl.
*H01S 3/00* (2006.01)
*H01S 3/223* (2006.01)
*G02B 19/00* (2006.01)
*B23K 26/06* (2014.01)
*G02B 5/08* (2006.01)

(52) U.S. Cl.
CPC ..... *G02B 19/0023* (2013.01); *G02B 19/0047* (2013.01); *G02B 19/0095* (2013.01); *G02B 27/0983* (2013.01); *H01S 3/0071* (2013.01); *H01S 3/2232* (2013.01); *B23K 26/0643* (2013.01); *G02B 5/0891* (2013.01); *G02B 5/10* (2013.01)

(58) Field of Classification Search
CPC ........ G02B 7/18; G02B 7/182; G02B 7/1821; G02B 7/1822; G02B 7/1827; G02B 7/1828; G02B 7/183; G02B 7/28; G02B 15/00; G02B 17/00; G02B 17/002; G02B 17/006; G02B 17/008; G02B 17/02; G02B 17/06; G02B 17/0647; G02B 17/0657; G02B 17/0663; G02B 17/0673; G02B 17/0684; G02B 17/0836; G02B 17/0844; G02B 17/0848; G02B 27/09; G02B 27/0938; G02B 27/0977; G02B 27/0983; H05G 2/008
See application file for complete search history.

(56) References Cited

U.S. PATENT DOCUMENTS

| | | | | |
|---|---|---|---|---|
| 5,999,311 | A | * | 12/1999 | Nanba .................... G02B 15/16 359/365 |
| 6,128,138 | A | | 10/2000 | Cole, III |
| 6,676,265 | B2 | * | 1/2004 | Carter .................... G02B 15/00 359/365 |
| 9,016,881 | B2 | * | 4/2015 | Lambert ................ H05G 2/008 359/859 |
| 2005/0178753 | A1 | * | 8/2005 | Yamazaki .............. B23K 26/06 219/121.78 |
| 2006/0140635 | A1 | * | 6/2006 | Yamamoto ......... G02B 17/0642 398/139 |
| 2011/0140008 | A1 | | 6/2011 | Bergstedt et al. |
| 2013/0250402 | A1 | * | 9/2013 | Nowak ................ G03F 7/70025 359/341.33 |
| 2014/0085741 | A1 | | 3/2014 | Lambert |
| 2015/0168713 | A1 | * | 6/2015 | Nowatzyk .......... G02B 26/0816 359/201.2 |

OTHER PUBLICATIONS

Notification of Transmittal of Translation of the International Preliminary Report on Patentability and Written Opinion of the International Searching Authority for PCT Application No. PCT/EP2015/051099, dated Aug. 3, 2017, 13 pages.

* cited by examiner

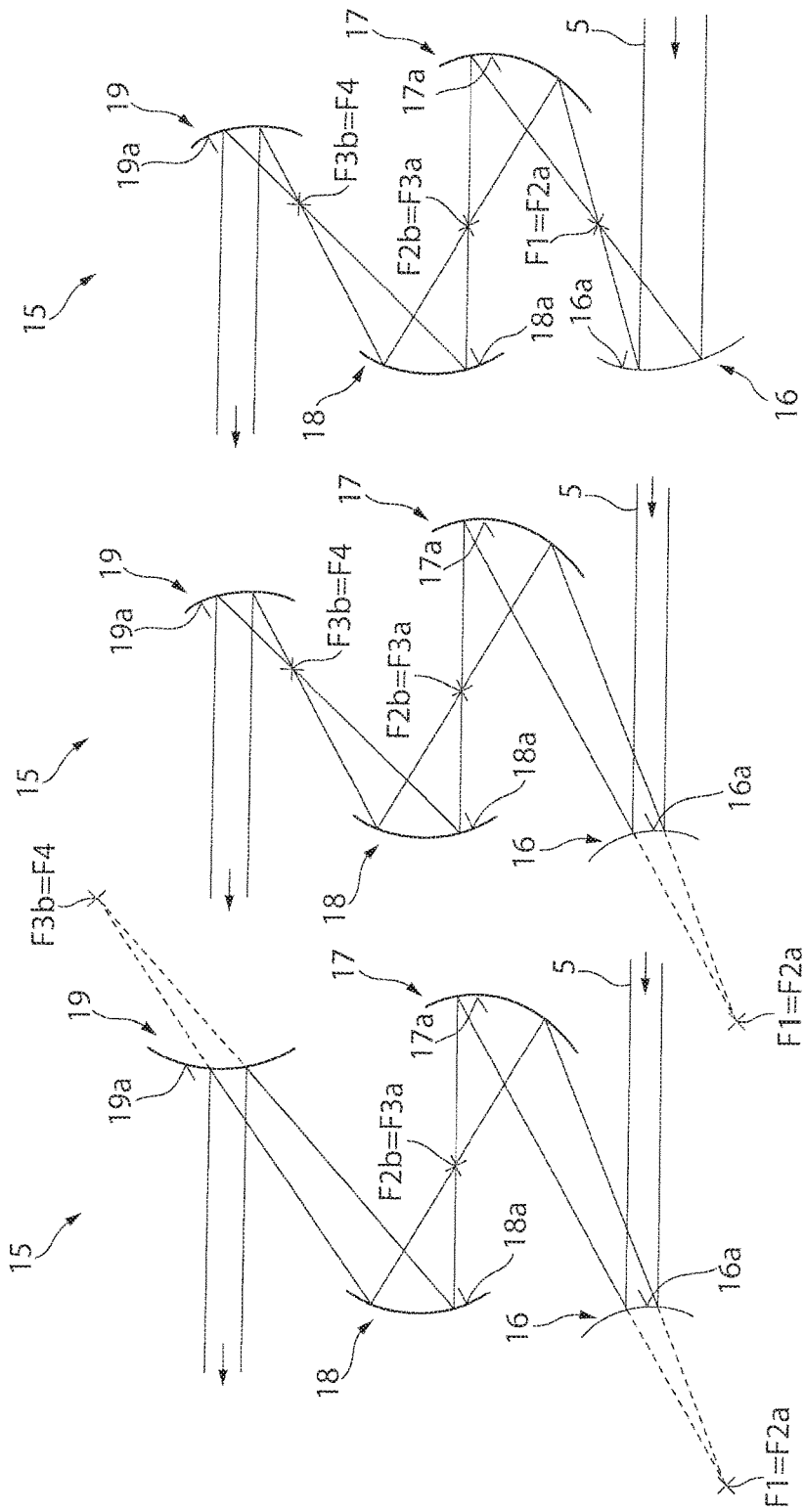

ADJUSTING A BEAM DIAMETER AND AN APERTURE ANGLE OF A LASER BEAM

CROSS-REFERENCE TO RELATED APPLICATIONS

This application is a continuation of and claims priority under 35 U.S.C. § 120 to PCT Application No. PCT/EP2015/051099 filed on Jan. 21, 2015. The entire contents of this priority applications is incorporated herein by reference.

TECHNICAL FIELD

The present invention relates to methods, apparatus, and devices for adjusting a beam diameter and an aperture angle of a laser beam, particularly for producing an Extreme ultraviolet (EUV) radiation.

BACKGROUND

A beam guiding device is typically embodied for beam guidance of a laser beam, e.g., a $CO_2$ laser beam, with a very high power (>10 kW). By way of example, the beam guiding device can be integrated into an EUV radiation generating apparatus to guide the laser beam in a direction of a target region for generating EUV radiation, the laser beam being focused on said target region with high accuracy. Another application for a beam guiding device for guiding a laser beam with a very high power (>10 kW) is represented by a laser processing machine which, for example, can be employed in welding applications.

A beam guiding device for an EUV radiation generating apparatus with a device for increasing the beam diameter (beam widening), which includes two off-axis parabolic mirrors in one exemplary embodiment disclosed in US 2011/0140008 A1. The beam guiding device described therein serves to guide laser radiation which was produced and amplified in a beam generating device in the form of a driver laser system. The beam guiding device guides the laser beam from the driver laser system to a focusing element or to a focusing device which serves to focus the laser beam into a target region in which a target material is provided, said target material transitioning into a plasma state upon irradiation with the laser beam and, in the process, emitting EUV radiation.

WO 2014/048563 A1 describes a beam guiding device for an EUV radiation generating apparatus, including a device for increasing or reducing the beam diameter of the laser beam. The device includes a first off-axis paraboloid mirror with a first, convexly curved reflecting surface and a second off-axis paraboloid mirror with a concavely curved reflecting surface. The beam guiding device includes a movement device which is embodied to modify a distance between the first reflecting surface and the second reflecting surface for modifying the aperture angle of the laser beam. When the distance is modified, there is not only a change in the aperture angle of the laser beam but also a (minor) change in the beam diameter.

A laser beam emitted by a beam generating device in the form of a laser source may vary both in respect of the beam diameter and in respect of the aperture angle (e.g., the beam divergence/beam convergence), depending on the emitted power of the laser source. Even in the case of laser sources with the same construction, the emitted laser beam may possibly vary from specimen to specimen, both in respect of the beam diameter and in respect of the aperture angle, in the case of identical operating parameters.

SUMMARY

Implementations of the present invention provide beam guiding devices, extreme ultraviolet (EUV) radiation generating apparatuses, and methods of adjusting a beam diameter and an aperture angle of a laser beam, where a laser beam suitable for an application can be produced.

Further advantages of the invention emerge from the description and the drawing. Likewise, the features mentioned above and the features yet to be listed below can find use respectively on their own or several of the features may be used together in any combination. The shown and described embodiments should not be construed to be a conclusive list, but instead have an exemplary character for explaining the invention.

DESCRIPTION OF THE DRAWINGS

FIGS. 6A, 6B, and 6C are schematic illustrations that are analogous to FIG. 2B, in which the adjustment device is embodied to produce one, two, or three intermediate foci.

DETAILED DESCRIPTION

Figure 1:
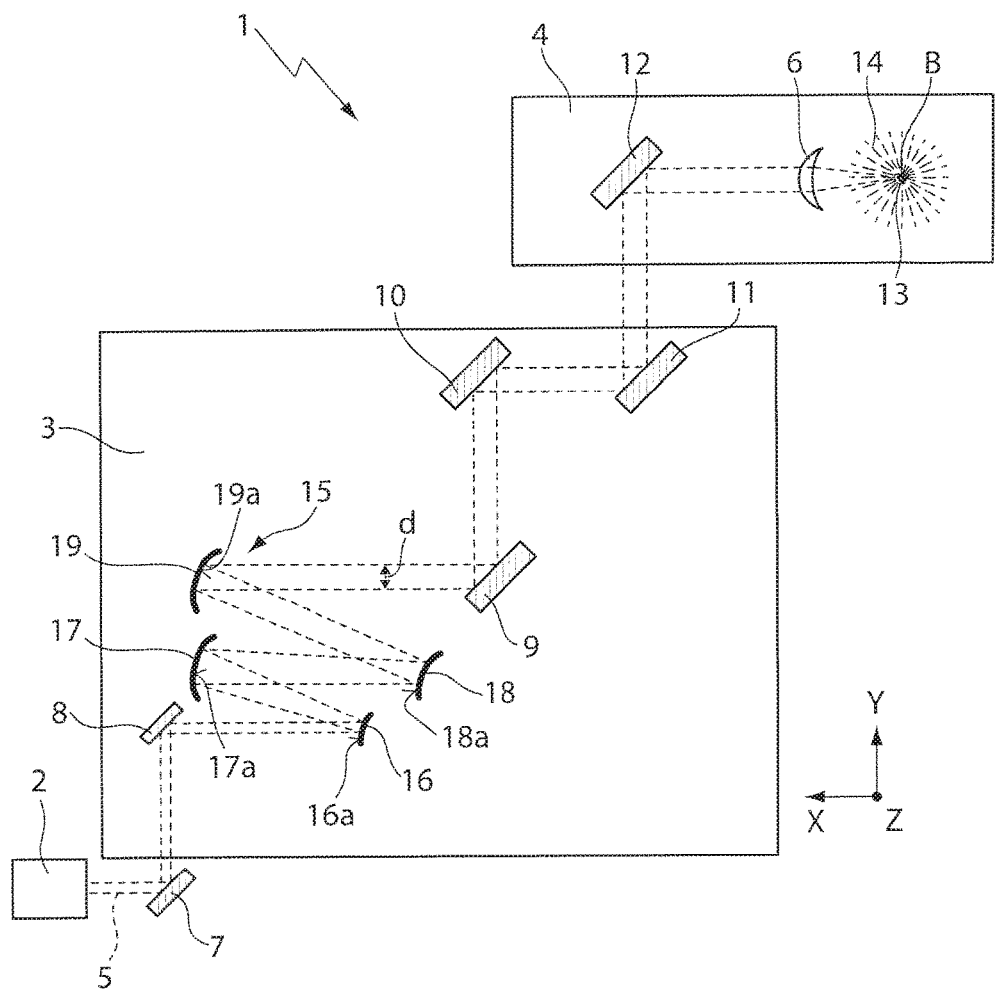
FIG. 1 is a schematic illustration of an EUV beam generating apparatus, which has a beam guiding device with an adjustment device with four mirrors for setting a beam diameter and an aperture angle of a laser beam.

One aspect of the present invention features beam guiding devices including an adjustment device for adjusting a beam diameter and an aperture angle of the laser beam. The adjustment devices include: a first mirror with a first curved reflecting surface, a second mirror with a second curved reflecting surface, a third mirror with a third curved reflecting surface, a fourth mirror with a fourth curved reflecting surface, and a movement device which is embodied (or configured), for adjusting the beam diameter and the aperture angle of the laser beam, to move, in particular displace, the first reflecting surface and the fourth reflecting surface relative to one another and, independently thereof, to move, in particular displace, the second reflecting surface and the third reflecting surface together relative to the first reflecting surface and the fourth reflecting surface.

The first mirror to fourth mirror are arranged in succession in the beam path of the laser beam. It is understood that further optical elements, e.g., in the form of folding mirrors, may optionally be arranged in the beam path between the four mirrors. If the adjustment device serves to increase the beam diameter of the laser beam, the incident laser beam can impinge in collimated or substantially collimated fashion on the first mirror. If the adjustment device serves to reduce the beam diameter of the laser beam, the incident laser beam can impinge in collimated fashion on the fourth mirror, e.g., the laser beam passes through the adjustment device in the reverse propagation direction. Since the mirrors of the beam guiding device can withstand high laser powers, the mirrors can have solid embodiments, e.g., the reflecting surface can be formed on a solid, e.g., a metallic main body, into which cooling channels for cooling the respective mirror can be introduced.

The curvature of the reflecting surface of a respective mirror is constant, i.e., the reflecting surface only distorts to a small extent in a known, calculable manner on account of an increase in temperature produced by the impinging laser radiation, the increase in temperature being comparatively small on account of the cooling. Aberrations that are possibly produced by such a deformation can, where necessary, be compensated for or already taken into account when designing the reflecting surface of the respective mirror. Adaptive mirrors, e.g., membrane mirrors, in which the curvature of the reflecting surface can be adjusted within certain boundaries, may be not suitable for the present beam guiding device on account of the high laser powers.

The beam guiding device described herein renders it possible to set the beam diameter and the aperture angle of the laser beam (substantially) independently of one another such that the laser beam can be optimized in a manner suitable for the application, e.g., either varied in terms of its properties or kept constant in terms of its properties, even during the operation of the beam guiding device. The adjustment device can be linked to a control and/or regulation device to control or regulate the beam diameter and the aperture angle of the laser beam, for example to take into account the dynamic thermal behavior of the components present in the beam guiding device or in the EUV radiation generating apparatus.

The aperture angle (or the divergence/convergence) of the laser beam may be set, for example, by virtue of the first mirror and the fourth mirror being moved relative to one another, with the distance between these two mirrors being modified as described in WO 2014/048563 A1, which is incorporated herein by reference. However, if the distance between the first mirror and the fourth mirror is changed, not only is the aperture angle changed, but the beam diameter of the laser beam is also changed to a small extent (as a parasitic effect). As a result of the independent movement of the second mirror and of the third mirror relative to the first mirror and the fourth mirror, the change in the beam diameter of the laser beam that is produced when modifying the aperture angle (i.e., changing the divergence/convergence) of the laser beam can be compensated, and so it is possible to set the desired divergence/convergence of the laser beam without changing the beam diameter. Accordingly, it is possible to set the beam diameter of the laser beam by the common movement of the second mirror and third mirror, with there only being a minor modification of the aperture angle of the laser beam (or of the convergence/divergence of the laser beam) (as a parasitic effect). By modifying the distance between the first mirror and the fourth mirror, it is possible to compensate the modification of the aperture angle, which can be desired. The movement of the first reflecting surface and the fourth reflecting surface relative to one another and the movement of the second surface and the third surface relative to the first surface and the fourth surface may occur with a time offset or at least partly simultaneously.

In principle, it could be optionally sufficient to have only a single further mirror in addition to the first minor and the fourth mirror for adjusting the beam diameter of the laser beam. However, the use of four mirrors for adjusting the beam diameter and/or the aperture angle can be advantageous to keep the energy distribution or the intensity of the laser beam over the beam cross section of the laser beam as constant as possible when modifying the beam diameter. By contrast, if an adjustment device only includes three minors, there can be a redistribution of the energy of the laser beam over the beam cross section, which, as a rule, may be unwanted, even if such an adjustment device is operated in the basic position (see below).

The adjustment device can be embodied to image the laser beam without an intermediate focus or with one, two or three intermediate foci in the beam path between the mirrors. The number of intermediate foci can be determined by the type of curvature (convex or concave) of the reflecting surfaces of the individual mirrors. The type of curvature of the four reflecting surfaces of the adjustment device can be set in such a way that the adjustment device produces the desired number of intermediate foci.

In an embodiment, the first reflecting surface and the third reflecting surface have a convex curvature and the second reflecting surface and the fourth reflecting surface have a concave curvature. In this embodiment, the laser beam passes through the adjustment device without an intermediate focus, which can be advantageous when using high laser powers. However, as already described above, it is also possible to produce one or more intermediate foci in the adjustment device. If one intermediate focus is produced, the first reflecting surface and the fourth reflecting surface each can have a convex curvature and the second reflecting surface and the third reflecting surface each can have a concave curvature. If the laser beam is imaged with two intermediate foci, only the first reflecting surface can have a convex curvature and the second to fourth reflecting surfaces can have concave curvatures. When imaging with three intermediate foci, all four reflecting surfaces can have a concave curvature.

In another embodiment, the second mirror and the third mirror can be embodied as nonsymmetrical (off-axis) ellipsoid mirrors. The use of two ellipsoid minors which can be moved, in particular displaced, together relative to the first minor and the fourth minor, facilitates the adjustment of the beam diameter of the laser beam, without the aperture angle of the laser beam being significantly modified in the process. What is advantageous here is that each of the two ellipsoid minors has two foci. In the case of a nonsymmetrical ellipsoid mirror (also referred to as off-axis ellipsoid minor), the reflecting surface, which forms a portion or segment of a rotational ellipsoid, is arranged offset to the two major axes of the rotational ellipsoid. The focal lengths, e.g., the distances of the two focal positions from the center of the ellipsoid mirror, are not the same in this case. The ellipsoid mirrors, or a respective ellipsoid mirror, can alternatively also have a symmetric embodiment. In this case, one of the two major axes of the rotational ellipsoid extends through the center of the reflecting surface such that the reflecting surface has rotational symmetry in relation to this major axis. In the case of a symmetric ellipsoid mirror, the focal lengths, e.g., the distances of the two focal positions, from the center of the ellipsoid mirror lying on the major axis are the same.

The ellipsoid mirrors can be arranged or embodied in such a way that one of the two focal positions of the second mirror corresponds to one of the two focal positions of the third mirror. Since the two ellipsoid mirrors can be arranged at a constant distance from one another, this arrangement of the focal positions is maintained, even during the common movement of the second mirror and third mirror.

As a result of the common movement of the two ellipsoid mirrors, the distance to the first mirror is either increased or decreased. As a result of increasing/decreasing the distance from the first mirror, there is an increase/decrease in the length of the path over which the laser beam passes between the first mirror and the second mirror and hence also in the beam cross section with which the laser beam impinges on the second reflecting surface of the second mirror. If the distance between the first mirror and the fourth mirror is kept constant, the length of the path over which the laser beam passes between the third mirror and the fourth mirror shortens/lengthens at the same time. Whether the beam diameter of the laser beam increases or reduces when moving the second mirror and the third mirror toward the first mirror or away from the first mirror depends on whether the first reflecting surface has a concave curvature or a convex curvature and whether an intermediate focus is formed between the first reflecting surface and the second reflecting surface. If no intermediate focus is formed between the first reflecting surface and the second reflecting surface and if the first surface has a convex curvature, the beam diameter reduces/increases when the distance between the first mirror and the second mirror reduces/increases. If the first mirror has a concave curvature, the beam diameter increases/decreases correspondingly if the distance between the first mirror and the second mirror decreases/increases.

In an embodiment, the first mirror and the fourth mirror are embodied as parabolic mirrors, in particular as off-axis parabolic mirrors. In the case of beam widening of laser radiation with large beam diameters and high laser powers (>1 kW), as are required in beam guiding devices for producing EUV radiation, the use of paraboloid mirrors can be advantageous since the spherical aberrations are comparatively large on account of the large beam diameters when spherical mirrors are used for beam widening. By contrast, if paraboloid mirrors are used, theoretically aberration-free imaging is facilitated in the case of a suitable alignment of the mirrors in relation to one another. To the extent that the spherical aberrations are still acceptable despite the use of large beam diameters, the first mirror and the fourth mirror may optionally also be embodied as spherical mirrors since spherical mirrors are comparatively easy to produce.

In another embodiment, the movement device is configured and arranged for relative movement of the first mirror and of the fourth mirror proceeding from a basic position (e.g., a relative movement between the first mirror and the fourth mirror that are moved from the basic position), in which a focal position of the first mirror corresponds to a first focal position of the second mirror, a second focal position of the second mirror corresponds to a first focal position of the third mirror, and a second focal position of the third mirror corresponds to a focal position of the fourth mirror. The second mirror and third mirror, which each have two focal positions, can be ellipsoid mirrors; the first mirror and the fourth mirror can be paraboloid mirrors or optionally (in the case of small beam diameters) spherical mirrors.

In the basic position, the focal positions of in each case two successive mirrors in the beam path correspond. Therefore—at least theoretically—no optical aberrations are produced in the basic position. If use is made of two symmetric ellipsoid mirrors, in which the entrance-side and the exit-side focal lengths correspond, the focal positions of all four mirrors can lie on a common straight line which—depending on the respective focal lengths and angles of incidence—may be aligned at, in principle, any angle in relation to the direction of incidence of the laser beam. If nonsymmetrical (off-axis) ellipsoid mirrors are used, this is not the case, and so more degrees of freedom are available for the optical design of the adjustment device.

The optical aberrations increase when varying the distance of the first mirror and of the fourth mirror, which, e.g., may be embodied as off-axis parabolic mirrors, out of the basic position. In the basic position, a laser beam that emerges in collimated fashion is produced at the fourth mirror from a laser beam that impinges on the first mirror in collimated fashion. If the relative position of the first mirror and the fourth mirror is changed, the aperture angle of the laser beam is influenced, and so a slightly convergent or divergent laser beam is formed from a collimated laser beam, as is produced in the basic position. In some cases, a (slightly) convergent laser beam is produced from the laser beam that emerges in collimated fashion by increasing the distance from the basic position. In some cases, a (slightly) divergent emerging laser beam is produced when reducing the distance from the basic position. The slight change in the beam diameter occurring when changing the aperture angle can be compensated by the common movement of the second mirror and the third mirror (see below).

In a further embodiment, the movement device is embodied for a common displacement of the second mirror and third mirror along a common displacement axis. It is advantageous if the reflecting surfaces of the second mirror and the third mirror maintain their alignment in relation to one another during the movement, e.g., if the movement is merely in a displacement but not in a rotation of the second mirror and of the third mirror. The common displacement direction can extend parallel to the laser beam axis of the laser beam that impinges on the second mirror, e.g., the second mirror is displaced along the laser beam axis of the impinging laser beam.

In a further embodiment, the laser beam axis of the laser beam between the first mirror and the second mirror and the laser beam axis of the laser beam between the third mirror and the fourth mirror extend parallel to one another and possibly parallel to the common displacement axis. As a result of the parallel alignment of the laser beam axis between the first mirror and the second mirror, and between the third mirror and the fourth mirror, which may be achieved by a suitable selection of the angles at which the laser beam impinges on the respective mirrors, it is possible to substantially simplify the movement effectuated by the movement device, in particular the displacement, of the second mirror and the third mirror relative to the first mirror and to the fourth mirror.

In an embodiment, the movement device is embodied to displace the first mirror and/or the fourth mirror along a further displacement axis, which can extend parallel to the common displacement axis. If the adjustment device serves to increase the beam diameter, the laser beam can be incident on the first mirror in collimated fashion such that the displacement of the first mirror, as a rule, does not have an optical effect. In this case, the movement device can be embodied only to displace the fourth mirror. If the adjustment device serves to reduce the beam diameter, the laser beam can be incident on the fourth mirror in collimated fashion. In this case, the movement device can be embodied only to displace the first mirror. To the extent that the adjustment device is operated with both propagation directions of the laser beam, the movement device may naturally be embodied to displace both the first mirror and the fourth mirror.

The further displacement direction can extend parallel to the laser beam axis of the laser beam that impinges on the fourth (or optionally on the first) mirror and the further displacement axis corresponds to the laser beam axis of the impinging laser beam. By displacing the fourth (or optionally the first) mirror out of the basic position, it is possible to set the aperture angle of the laser beam, e.g., the divergence or the convergence of the laser beam (see above). In the case of a displacement along such a displacement axis, the imaging remains with little aberration over a surprisingly large variation range, and so the convergence/divergence of the laser beam can be varied over a comparatively large range (up to approximately 10-20 mrads). The aberrations that occur when influencing the beam convergence or the beam divergence by using an adaptive mirror (e.g., a mirror with a changeable curvature) can be significantly larger.

For the displacement along the further displacement axis, the relevant (first or fourth) mirror can be mounted in a linearly movable manner on guides and displaced in the displacement direction by means of an actuator, e.g., by a linear motor. The common displacement of the second mirror and the third mirror may be effectuated in an analogous manner.

In a further embodiment, the second reflecting surface of the second mirror is arranged at a fixed distance from the third reflecting surface of the third mirror. It can be advantageous if the distance between the second reflecting surface and the third reflecting surface is kept constant during the movement of the second mirror and the third mirror with the aid of the movement device (or overall). The distance between the two mirrors can be kept constant, for example, with the aid of spacers or the like.

In a development, the second mirror and the third mirror are attached to a common carrier at a fixed distance from one another and the movement device is embodied to move the common carrier for the common movement of the second mirror and the third mirror relative to the first mirror and the fourth mirror. In this case, the movement device engages on the common carrier, e.g., by an actuator, to move the two mirrors together, in particular to displace the two mirrors together. The carrier can be mounted in a linearly movable manner on guides and may be moved by an actuator, e.g. by a linear motor.

In another development, the common carrier is embodied as a common housing, which includes a second opening for the entrance of the laser beam from the first mirror and a third opening for the exit of the laser beam to the fourth mirror. It is understood that the laser beam may also pass through the housing in the opposite propagation direction. The second mirror and the third mirror can be arranged on mutually opposing ends of the housing, which may be embodied as a cylinder, for example with a square or rectangular base area (e.g., as a cuboid). In this case, the second opening and the third opening can be arranged along the lateral cylinder surface and the laser beam axis can extend approximately along the longitudinal axis of the common housing.

If the common housing is moved along the common displacement direction, which corresponds to the laser beam axis of the laser beam incident on the second mirror, the position of the laser beam relative to the common housing does not change in the case of the displacement, and so the laser beam can enter into the common housing through the second opening and emerge from the common housing through the third opening. By arranging the second mirror and the third mirror in a common housing, it is possible to protect the reflecting surfaces of the second mirror and of the third mirror from contamination.

In a further embodiment, the first mirror is arranged in a housing which includes a first opening for the exit of the laser beam to the second mirror and/or the fourth mirror is arranged in a further housing which includes a fourth opening for the entrance of the laser beam from the third mirror. Housing the first mirror and/or the fourth mirror in a respective housing renders it possible to protect these from contamination. The housing or the further housing may, in particular, be embodied as a cylinder, in particular as a cuboid. The first mirror and the fourth mirror can be attached to an end face of the housing and of the further housing, respectively. The laser beam can enter into the adjustment device at the end face at the end of the housing distant from the first mirror and emerge from the adjustment device at the end face at the end of the further housing distant from the fourth mirror, where, as a rule, the laser beam axis corresponds to the longitudinal axis of the housing and/or the further housing.

In a further embodiment, the movement device is embodied to move the housing and the further housing relative to one another for moving the first reflecting surface and the fourth reflecting surface relative to one another. By way of example, the movement device may engage on the housing and/or on the further housing by an actuator to effectuate a movement or a displacement of the housing or of the further housing.

In a further embodiment, the adjustment device is embodied to produce a Z-fold of the laser beam at the first mirror and at the second mirror. In the case of a Z-fold of a laser beam at two mirrors, the laser beam axis of the laser beam incident on the first mirror extends substantially parallel to the laser beam axis of the emerging laser beam that was reflected at the second mirror. The use of a Z-fold of the laser beam facilitates a compact implementation of the adjustment device.

In an embodiment, the adjustment device is embodied to produce a further Z-fold of the laser beam at the third mirror and at the fourth mirror. The use of two Z-folds of the laser beam facilitates a particularly compact implementation of the adjustment device. In particular, the Z-fold and the further Z-fold can be arranged in succession in such a way that the laser beam axis of the laser beam that is incident on the first mirror and enters into the adjustment device extends parallel to the laser beam axis of the laser beam that is reflected at the fourth mirror and emerges from the adjustment device. Also, the two Z-folds, or the angles at which the laser beam impinges on the respective mirror, may be matched to one another in such a way that the laser beam axis of the laser beam between the first mirror and the second mirror extends parallel to the laser beam axis between the third mirror and the fourth mirror, to be precise independently of the respective positioning or position of the movement device (see above), as a result of which the movement, more precisely the displacement, of the second mirror and third mirror relative to the first mirror and fourth mirror can be significantly simplified.

In an embodiment, the beam guiding device is embodied to guide a $CO_2$ laser beam. Preferably, reflecting optical elements are used for guiding a $CO_2$ laser beam, e.g., a laser beam with a wavelength of approximately 10.6 µm. The optical elements can be composed, at least in the region of their surfaces, of metallic materials, e.g., copper, on which a highly reflecting coating can be applied. Transmitting optical elements can also be used for the beam guidance of $CO_2$ laser radiation. However, only a small number of materials that are transparent to $CO_2$ laser radiation exist. One such material is zinc selenide, which, inter alia, can also be used for the lens production.

At least one tiltable and/or displaceable deflection mirror for compensating a beam offset during the movement, in particular during the displacement, of the fourth mirror may be arranged in the beam guiding device in the beam path downstream of the adjustment device. For compensating the beam offset, a device can be made, in particular, of two tiltable or displaceable deflection mirrors which are tilted by such angles or displaced by such travels in relation to one another that the beam offset of the laser beam caused by the displacement can be compensated.

The (at least one) deflection mirror can be movement-coupled with the fourth mirror for the common displacement. As a result of the movement coupling, a common drive of the movement device can be used for the common movement of the fourth mirror and of the deflection mirror such that it is possible to dispense with an additional controller for coordinating or synchronizing the displacement movement of the fourth mirror with the movement of the deflection mirror. The displacement movement of the deflection mirror need not necessarily be along the common displacement direction or the further displacement direction, e.g., the movement coupling can be designed in such a way that the deflection mirror is displaced in a direction that deviates from the displacement direction or the further displacement direction. By way of example, this can be achieved by a force-coupled movement of the fourth mirror with the aid of a suitable (forced) guidance.

A further aspect of the invention relates to an EUV radiation generating apparatus, including: a beam generating device for generating a laser beam, a vacuum chamber, into which a target material is introducible in a target region for the purposes of producing EUV radiation, and a beam guiding device as described above for guiding the laser beam from the beam producing device in the direction of the target region. As a result of the beam guiding device, to be precise as a result of the adjustment device, it is possible to set both the beam diameter of the laser beam and the aperture angle of the laser beam over a comparatively large value range. By way of example, proceeding from a nominal magnification of the beam diameter by a factor of, e.g., 2.0, the scale of the magnification of the beam diameter can be set in a value range between, e.g., approximately 1.6 and 2.4. It is also possible to set the aperture angle of the laser beam or the convergence/divergence of the laser beam over a comparatively large range of, e.g., approximately 10-20 mrads or more.

A further aspect of the invention relates to a method of adjusting a beam diameter and an aperture angle of a laser beam by a beam guiding device as described above. The method includes: moving the first reflecting surface and the fourth reflecting surface relative to one another and moving the second reflecting surface and the third reflecting surface together relative to the first reflecting surface and the fourth reflecting surface until the predetermined beam diameter and the predetermined aperture angle are reached.

As described further above, the modification of the distance between the first reflecting surface and fourth reflecting surface leads to a change in the aperture angle of the laser beam, with a change in the beam diameter also setting-in as a parasitic effect. A change in the aperture angle may likewise emerge as a parasitic effect during the relative movement of the second reflecting surface and the third reflecting surface relative to the first reflecting surface and the fourth reflecting surface for the purposes of setting the beam diameter. Both the change in the beam diameter occurring as a parasitic effect and the change in the aperture angle occurring as a parasitic effect can be compensated by virtue of carrying out a suitable relative movement of the first reflecting surface and the fourth reflecting surface in relation to one another or a suitable relative movement of the second reflecting surface and third reflecting surface relative to the first reflecting surface and fourth reflecting surface, e.g., both parasitic effects can be compensated where required.

In the following description of the drawings, identical reference signs are used for the same or functionally equivalent components.

FIG. 1 shows an EUV radiation generating apparatus 1 that includes a driver laser device 2, a beam guiding device 3 (beam guiding chamber), and a vacuum chamber 4. A focusing device in the form of a focusing lens 6 is arranged in a vacuum environment formed in the vacuum chamber 4 to focus a $CO_2$ laser beam 5 in a target region B. The EUV radiation generating apparatus 1 shown in FIG. 1 substantially corresponds to the design described in US 2011/0140008 A1, which is incorporated into the content of this application by reference in its entirety. The illustration of measuring devices for monitoring the beam path of the laser beam 5 was dispensed with for reasons of clarity. As an alternative or in addition to a focusing lens 6, the focusing device can have at least one reflecting optical element.

The driver laser device 2 includes a $CO_2$ beam source and a plurality of amplifiers for producing a laser beam 5 with a high radiation power (>1 kW). Reference is made to US 2011/0140008 A1 for a detailed description of examples of possible configurations of the driver laser device 2. From the driver laser device 2, the laser beam 5 is deflected by a plurality of deflection mirrors 7 to 11 in the beam guiding chamber 3 and a further deflection mirror 12 in the vacuum chamber 4 onto the focusing lens 6, which focuses the laser beam 5 in the target region B, in which tin is arranged as a target material 13. Instead of the focusing lens 6, one or more mirrors for focusing the $CO_2$ laser beam into the target region B can also be used. It is understood that other materials to tin can also be used as target material 13.

The target material 13 is hit by the focused laser beam 5 and, in the process, converted into a plasma state, which serves for the generating of EUV radiation 14. The target material 13 is supplied to the target region B with the aid of a provisioning device (not shown here), which guides the target material 13 along a predetermined path which crosses the target region B. In respect of details relating to the provision of the target material, reference is likewise made to the US 2011/0140008 A1.

An adjustment device 15 is arranged in a beam guiding space in the beam guiding chamber 3, the adjustment device 15 serving to set a beam diameter d of the laser beam 5 and an aperture angle α (cf. FIG. 5B) of the laser beam 5. The adjustment device 15 includes a first mirror 16 which has a first, convexly curved reflecting surface 16a. The laser beam 5 that is incident on the first mirror 16 in collimated fashion is reflected by the first reflecting surface 16a as a divergent laser beam 5 and it is incident on a second mirror 17, which has a second, concavely curved reflecting surface 17a. The laser beam 5 leaves the second mirror 17 as a converging laser beam 5 and it is incident on a third mirror 18, which has a third, convexly curved reflecting surface 18a. The laser beam 5 is reflected by the third mirror 18 as a divergent laser beam 5 and it is incident on a fourth mirror 19, which has a fourth, concavely curved reflecting surface 19a. The radii of curvature of the four reflecting surfaces 16a-19a of the four mirrors 16-19 are matched to one another in such a way that the laser beam 5 is reflected in the manner described further above, e.g., that the laser beam 5 is divergent between the first mirror 16 and the second mirror 17, convergent between the second mirror 17 and the third mirror 18, and divergent between the third mirror 18 and the fourth mirror 19.

In the shown example, the first mirror 16 and the fourth mirror 19 are embodied as off-axis parabolic mirrors, e.g., the first reflecting surface 16a and the fourth reflecting surface 19a each form an off-axis segment of an (elliptical) paraboloid. The term "off-axis" means that the reflecting surfaces 16a, 19a do not contain the axis of rotation of the paraboloid (and hence do not contain the vertex of the paraboloid either). The second mirror 17 and the third mirror 18 are embodied as ellipsoid mirrors, e.g., the reflecting surfaces 17a, 18a each form a segment of an ellipsoid. In principle, the reflecting surfaces 17a, 18a may form symmetric segments of an ellipsoid, and so a respective segment of the ellipsoid has two equal focal lengths or back focal lengths for the incident laser beam and for the emerging laser beam.

In the example shown below in FIGS. 2A and 2B, the second mirror 17 is a nonsymmetrical ellipsoid mirror (also referred to as an off-axis ellipsoid mirror), in which the reflecting surface 17a forms a segment of an ellipsoid which does not extend with rotational symmetry with respect to one of the major axes of the ellipsoid indicated in FIG. 2B, the reflecting surface 17a forming a portion of said ellipsoid. The same applies to the reflecting surface 18a of the third mirror 18. The second mirror 17 and the third mirror 18 each have a different back focal length and focal length for the incident laser beam 5 and for the emerging laser beam 5. The use of the second mirror 17 and of the third mirror 18 in the form of off-axis ellipsoid mirrors facilitates more degrees of freedom in relation to the design and the spacings of the four mirrors 16 to 19 than is the case for symmetrical ellipsoid mirrors.

For setting the beam diameter d and the aperture angle α of the laser beam 5, the adjustment device 15 includes a movement device 20 which is subsequently described in more detail on the basis of FIG. 2A. In the shown example, the movement device 20 has a basic body in the form of a carrier plate 21, on which a (first) housing 22 is fastened rigidly, e.g., by way of a screw-in connection. The housing 22 is embodied in the form of a cylinder with a rectangular base area (e.g., in the form of a cuboid) and has an entrance opening (not shown here) at one end, through which the collimated laser beam 5, which propagates along a beam axis (X-axis of an XYZ-coordinate system), enters into the housing 22. Attached to the other end of the housing 22 is the first mirror 16, at the reflecting surface 16a of which the laser beam 5 emerges through a first opening 23 in the direction of the second mirror 17 which, together with the third mirror 18, is arranged in a common, cuboid housing 24. The second mirror 17 and the third mirror 18 are arranged at a fixed distance A from one another at opposite ends of the common housing 24, which likewise has a cuboid embodiment.

The divergent laser beam 5 enters into the common housing 24 at a second opening 25 (which is covered in FIG. 2A), it is reflected from the second mirror 17 to the third mirror 18, and leaves the common housing 24 by way of a third opening 26. The laser beam 5 emerging from the common housing 24 enters into a further housing 28 through a fourth opening 27 (which is covered in FIG. 2A), the fourth mirror 19 being arranged in said further housing. The further housing 28 likewise has a cuboid embodiment and the fourth mirror 19 is attached to one end of the cuboid housing 28. At the opposite end of the further housing 28, the laser beam 5 emerges from the further housing 28, and hence from the adjustment device 15, at an exit opening.

Figure 2A:
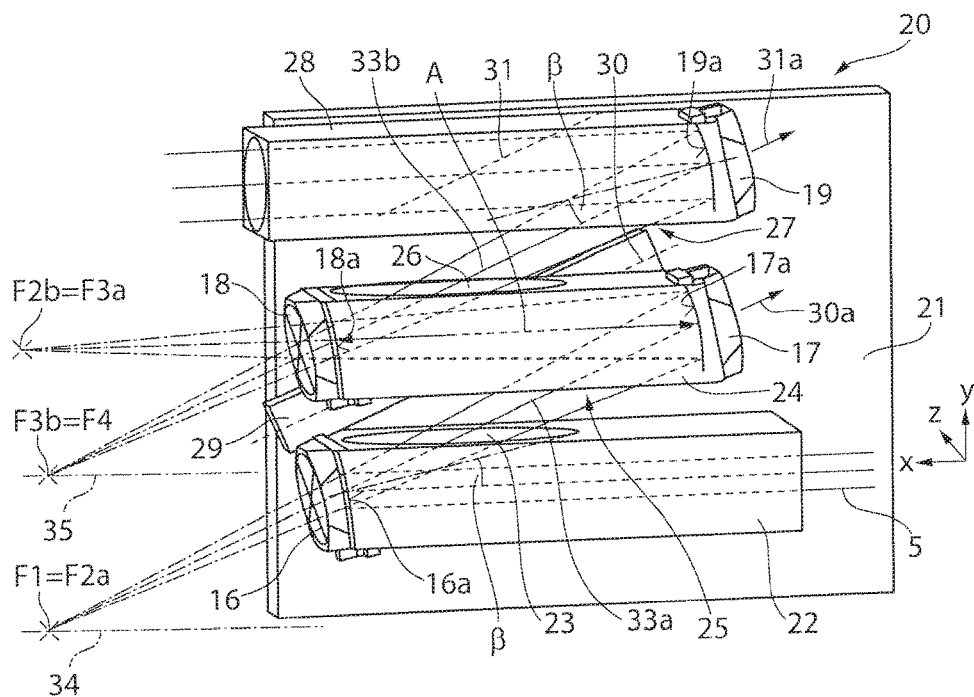
FIGS. 2A and 2B are schematic illustrations of a movement device for the adjustment device of FIG. 1 in a basic position, in which the movement device produces a nominal magnification of the beam diameter, and of the beam path of the adjustment device in the basic setting of the movement device.
Figure 2B:
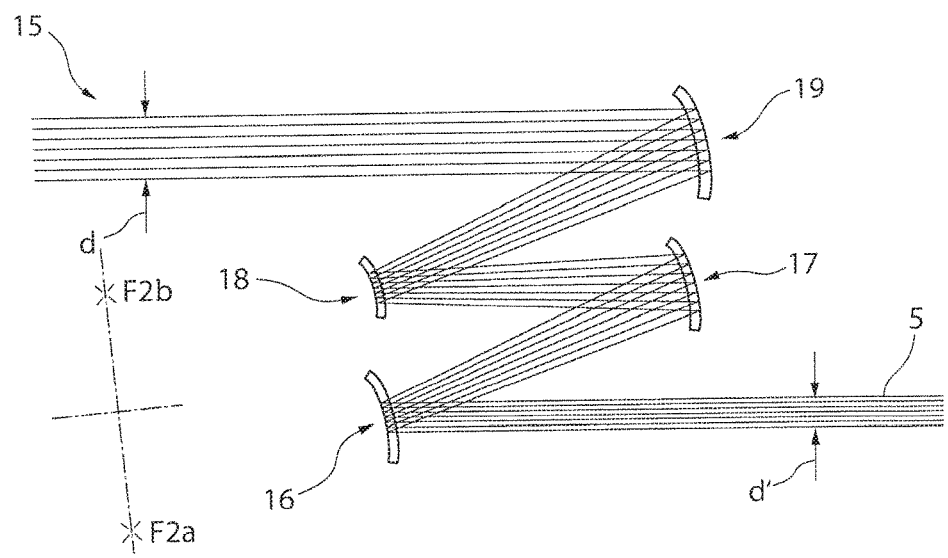

In the example shown in FIGS. 2A and 2B, the first mirror 16 and the second mirror 17 produce a Z-fold of the laser beam 5 that is incident in the adjustment device 15 along the X-direction, i.e., the laser beam 5 reflected at the second mirror 17 has substantially the same propagation direction as the incident laser beam 5, i.e., it extends with a substantially parallel offset to the incident laser beam 5. Accordingly, the third mirror 18 and the fourth mirror 19 of the adjustment device 15 produce a further Z-fold, i.e., the laser beam 5 impinging on the third mirror 18 is reflected by the third mirror 18 and fourth mirror 19 in such a way that the laser beam extends substantially parallel to the laser beam 5 impinging on the third mirror 18. The Z-fold at the first mirror 16 and second mirror 17 and the further Z-fold at the third mirror 18 and fourth mirror 19 are matched to one another in such a way that the laser beam 5 that is incident into the adjustment device 15 and the laser beam 5 that emerges from the adjustment device 15 extend parallel to one another, i.e., propagate in the X-direction in the shown example.

The Z-fold at the first mirror 16 and second mirror 17, and the further Z-fold at the third mirror 18 and fourth mirror 19 are matched to one another in such a way that the laser beam axis 33a of the laser beam 5 between the first mirror 16 and the second mirror 17, and the laser beam axis 33b between the third mirror 18 and the fourth mirror 19, correspond. If, as in the shown example, the laser beam 5 that is incident into the adjustment device 15 and the laser beam 5 that emerges from the adjustment device 15 extend parallel to one another, an angle of incidence β of the laser beam 5 on the first mirror 16 typically corresponds in this case to an angle of incidence β of the laser beam 5 on the fourth mirror 19. As a result of the parallel alignment of the respective laser beam axes 33a, 33b of the laser beam 5, the housing 24 with the second mirror 17 and third mirror 18 can be displaced without a beam offset occurring in this case. Without such a parallel alignment, a separate actuation of all four mirrors 16 to 19 might be required to compensate a possibly occurring beam offset.

In the example shown in FIGS. 2A and 2B, both the common housing 24 and the further housing 28 are mounted on the carrier plate 21 in a movable, more precisely displaceable, manner. The movement device 20 is embodied to move, more precisely displace, the common housing 24 and the further housing 28 independently of one another. For this purpose, a guide plate 29 is fastened to the outer side of the common housing 24, and it is possible to displace said guide plate along a common displacement direction 30 which corresponds to the longitudinal direction of the guide plate 29. The guide plate 29 is fastened to the common housing 24 in such a way (substantially centrally in the shown example) that, in the case of the displacement along the common displacement direction 30, the displacement direction 30 forms a displacement axis 30a at the position at which the laser beam 5 impinges on the second mirror 17, said displacement axis corresponding to the laser beam axis of the laser beam 5 impinging on the second reflecting surface 17a of the second mirror 17.

Accordingly, the fourth mirror 19 is also fastened to a further guide plate (not shown in FIG. 2A) to displace the further housing 28 along a further displacement direction 31 which, in the shown example, extends parallel to the common displacement direction 30. The further guide plate is fastened to the further housing 28 in such a way (substantially centrally in the shown example) that the further displacement direction 31, at the position at which the laser beam 5 impinges on the fourth mirror 19, forms a further displacement axis 31a, which corresponds to the laser beam axis of the laser beam 5 that impinges on the fourth reflecting surface 19a of the fourth mirror 19.

The guide plate 29 is mounted in a linearly movable manner between two linear guides 32a, 32b that are formed on the carrier plate 21, said linear guides being illustrated in FIG. 3A to FIG. 5A. The same applies to the further guide plate, the illustration of which was dispensed with for reasons of clarity, just like the illustration of further linear guides in FIG. 2A to FIG. 5A. The guide plate 29 can be displaced between the two linear guides 32a, 32b along the common displacement direction 30 by means of an actuator (not shown), for example a linear motor. The further housing 28 can also be displaced between the two further linear guides along the further displacement direction 31 by means of a further actuator, for example a further linear motor.

The movement device 20 is embodied to actuate the actuator and the further actuator independently of one another such that the common housing 24 and the further housing 28 can be displaced independently of one another along the common displacement axis 30a and along the further displacement axis 31a, respectively. During the movement of the common housing 24, the second mirror 17 and the third mirror 18 are displaced together relative to the first mirror 16 and the fourth mirror 19. During the movement of the further housing 28, the fourth mirror 19 is displaced relative to the first, stationary mirror 16.

FIG. 2A shows the movement device 20 in a basic position, in which a focal position F1 of the first mirror 16 that is embodied as a paraboloid and a first focal position F2a of the second mirror 17 that is embodied as ellipsoid correspond. Independently of the respective positioning of the adjustment device 15, a second focal position F2b of the second mirror 17 corresponds to a first focal position F3a of the third mirror 18 that is likewise embodied as an ellipsoid since the two mirrors are arranged at a constant distance from one another. Furthermore, in the basic position, a second focal position F3b of the third mirror 18 corresponds to a focal position F4 of the fourth mirror 19 that is embodied as a paraboloid. The axis of symmetry 34 (axis of rotation) of the first (parabolic) mirror 16, on which its focal position F1 is situated, and the axis of symmetry 35 of the fourth (parabolic) mirror 19, on which its focal position F4 is situated, are aligned parallel to one another.

FIG. 2B shows the beam profile of the laser beam 5 through the adjustment device 15 in the basic position of the movement device 20 shown in FIG. 2A. The laser beam 5 that is incident in the adjustment device 15 in collimated fashion emerges from the adjustment device 15 in collimated fashion in the basic position, with the beam diameter d of the emerging laser beam 5 being greater by a factor M relative to the beam diameter d' of the laser beam 5 entering into the adjustment device 15, i.e., the magnification nominally brought about by the adjustment device 15 is d/d'=M.

When using off-axis ellipsoid mirrors 16, 17, the (magnification) factor M of the adjustment device 15 emerges as the product of the (magnification) factor M12=−f2a/f1 of the imaging by the first mirror 16 and the second mirror 17, the (magnification) factor M23=−f3a/f2b of the imaging by the second mirror 17 and third mirror 18, and by the (magnification) factor M34=−f4/f3b of the imaging by the third mirror 18 and the fourth mirror 19, i.e., the following applies:

$$M=-f4/f1 \times f2a/f2b \times f3a/f3b,$$

where f1, f2a, f2b, f3a, f3b, f4 respectively denote the focal length, e.g., the distance between the respective mirror 16 to 19, or the respective reflecting surface 16a to 19a, and the respective focal position F1, F2a, F2b, F3a, F3b, F4. For the distance d12 between the first mirror 16 and the second mirror 17, in the basic position, d12=f1+f2a applies, for the distance d23 (and A) between the second mirror 17 and the third mirror 18, d23=f2b+f3a applies and for the distance d34 between the third mirror 18 and the fourth mirror 19, d34=f3b+f4 applies. The focal lengths f1, f2a, f2b, f3a, f3b, f4 of the first mirror 16 to the fourth mirror 19 are dependent on the available installation space and, for example, may lie in the order of magnitude between approximately 500 mm and approximately 1000 mm.

If the second mirror 17 and the third mirror 18 are embodied as symmetrical ellipsoid mirrors, the (magnification) factor simplifies as follows: M=−f4/f1. In this case, the following applies for the distance d12 between the first mirror 16 and the second mirror 17, the distance d23 (or A) between the second mirror 17 and the third mirror 18, and for the distance d34 between the third mirror 18 and the fourth mirror 19: d12=f1+f2, d23=f2+f3 and d34=f3+f4. As described further above, symmetrical ellipsoid mirrors have identical focal lengths, i.e. the following applies in this case: f2a=f2b=f2 and f3a=f3b=f3.

In the basic position, the second mirror 17 and the third mirror 18 are arranged in such a way that imaging of the incident laser beam 5 by the adjustment device 15 is carried out practically without aberrations since two of the focal positions F1, F2a, F2b, F3a, F3b, F4 coincide in each case. In the example shown in FIG. 2B, the incident laser beam 5 has a beam diameter d' of approximately 40 mm.

Figure 3A:
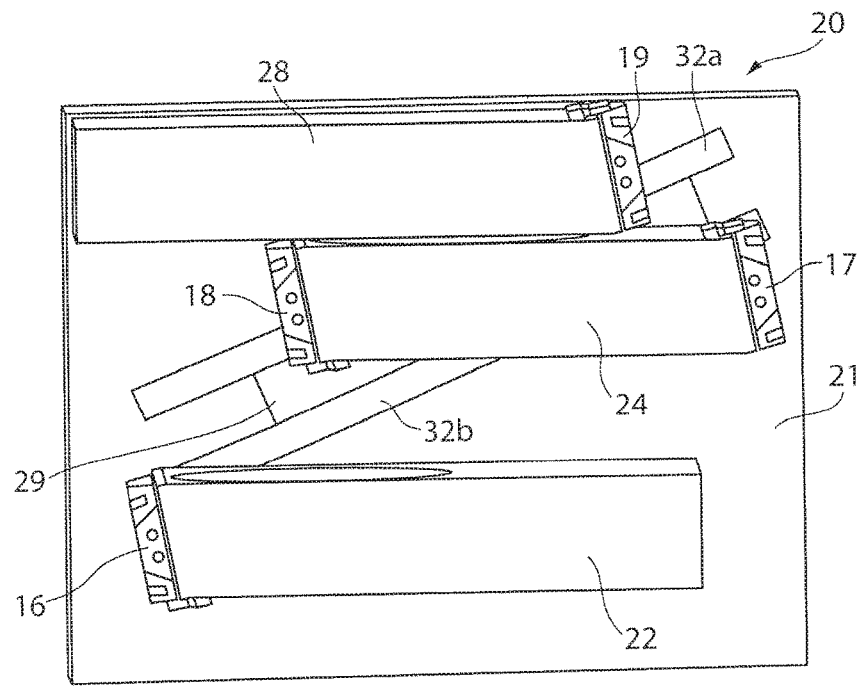
FIGS. 3A and 3B are schematic illustrations that are analogous to FIGS. 2A and 2B in a position of the movement device in which the latter produces a minimum magnification of the beam diameter.
Figure 3B:
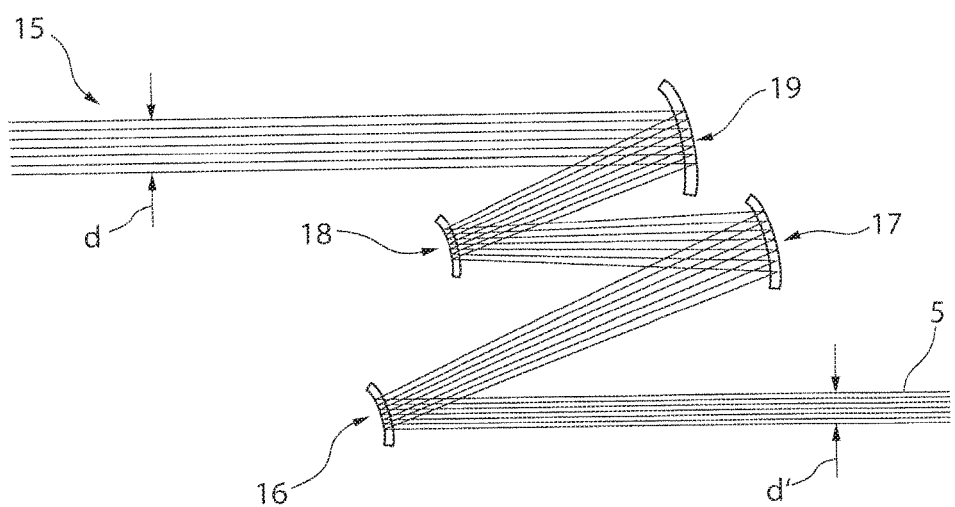

FIGS. 3A and 3B show the movement device 20 and the beam profile through the adjustment device 15 in an upper position of the common housing 24, in which the further housing 28 has been slightly displaced out of the basic position shown in FIG. 2A to compensate a parasitic change in divergence of the laser beam 5, and so the emerging laser beam 5 continues to be collimated. In FIGS. 3A and 3B, the common housing 24 is displaced into an upper position, in which it adjoins the further housing 28. In the upper position shown in FIG. 3A, the further housing 28 is therefore arranged at a maximum possible distance from the first mirror 16 or from the housing 22. In the upper position shown in FIGS. 3A and 3B, the adjustment device 15 produces an emerging, collimated laser beam 5 with a minimum possible beam diameter d, the size of which depends on the possible displacement paths of the movement device 20 and the employed focal lengths and which, for example, may be at approximately 80% of the magnification factor M produced in the basic position.

Figure 4A:
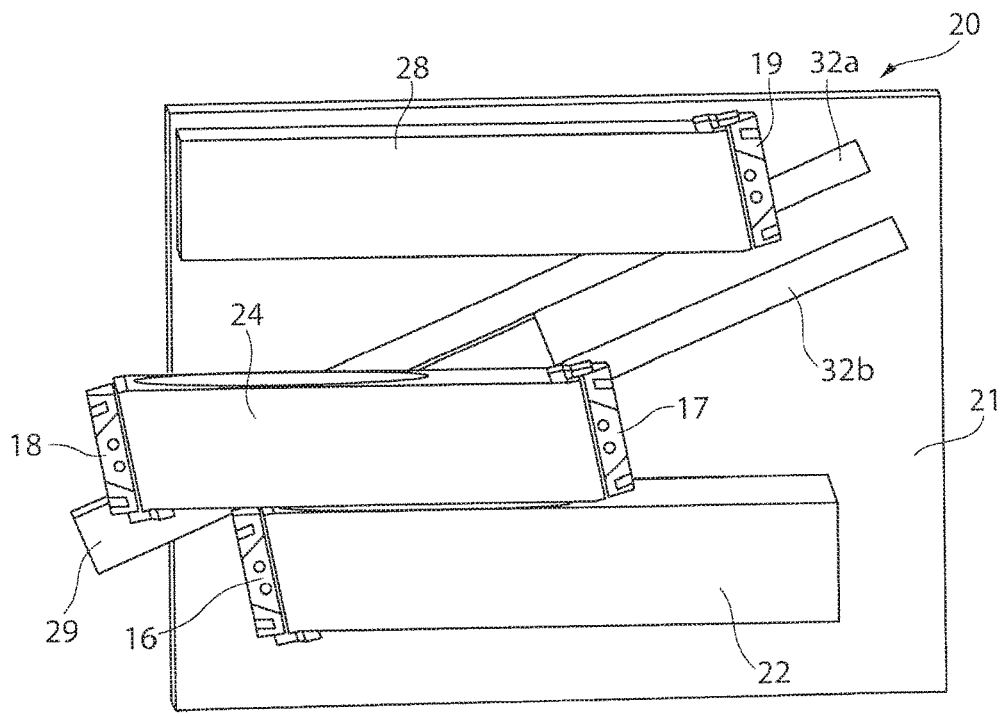
FIGS. 4A and 4B are schematic illustrations that are analogous to FIGS. 2A and 2B in a position of the movement device in which the latter produces a maximum magnification of the beam diameter.
Figure 4B:
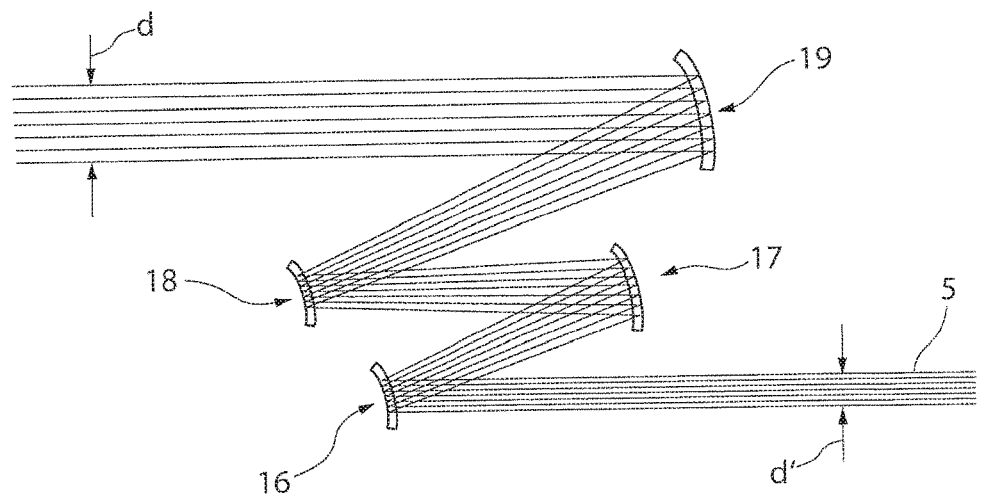

FIGS. 4A and 4B show the movement device 20 or the beam profile through the adjustment device 15 in a lower position of the common housing 24, in which the further housing 28 has likewise been slightly displaced out of the basic position shown in FIG. 2A in order to compensate a parasitic change in divergence of the laser beam 5 and produce a collimated emerging laser beam 5. In FIGS. 4A and 4B, the common housing 24 is displaced into a lower position, in which the latter adjoins the stationary housing 22 in which the first mirror 16 is arranged. In the lower position shown in FIG. 4A, the further housing 28 is therefore arranged at a minimum possible distance from the first mirror 16 or from the housing 22. In the lower position shown in FIGS. 4A and 4B, the adjustment device 15 produces an emerging, collimated laser beam 5 with a maximum possible beam diameter d, the size of which depends on the possible displacement paths of the movement device 20 and the employed focal lengths and which, for example, may lie at approximately 120% of the magnification factor M produced in the basic position.

Figure 5A:
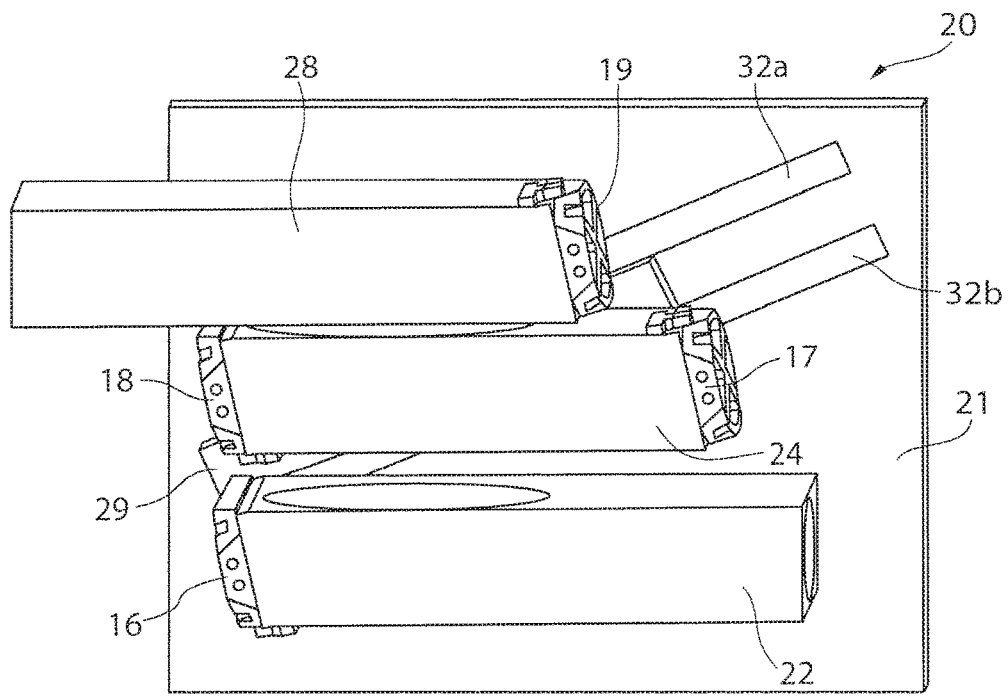
FIGS. 5A and 5B are schematic illustrations that are analogous to FIGS. 2A and 2B in a position of the movement device in which the latter produces a laser beam with the maximum possible beam divergence.
Figure 5B:
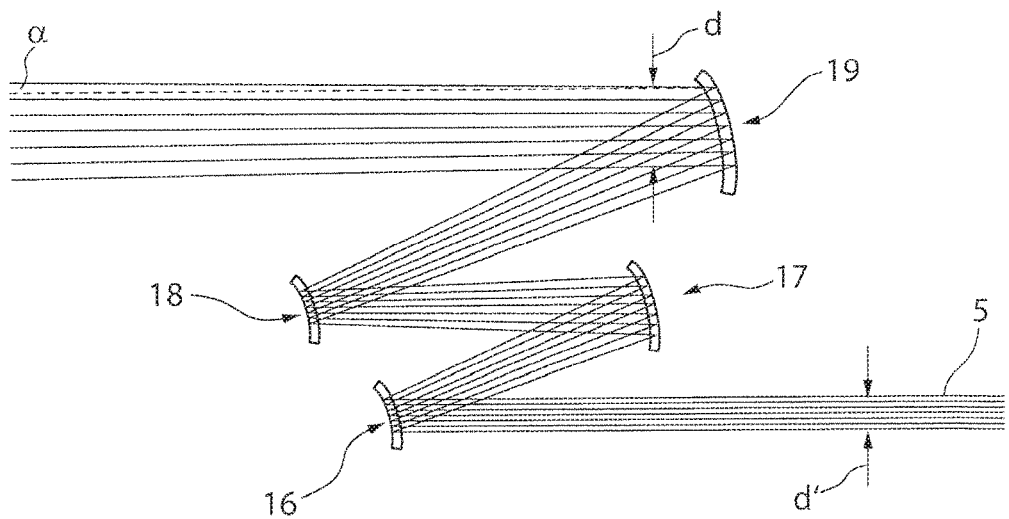

Finally, FIGS. 5A and 5B show the movement device 20 and the beam profile through the adjustment device 15 in a position in which the common housing 24 is positioned like in the basic position shown in FIG. 2A. In the position shown in FIGS. 5A and 5B, the further housing 28 is displaced along the further displacement axis 31*a* into a lower position, in which the further housing 28 adjoins the common housing 24. In the position shown in FIGS. 5A and 5B, the adjustment device 15 produces a divergent emerging laser beam 5 with approximately the maximum possible divergence, e.g., the (half) aperture angle $\alpha$ of the laser beam 5 is increased by the maximum possible value in relation to the laser beam axis (X-direction), wherein the magnitude of the maximum (half) aperture angle $\alpha$, for example, may be on the order of a few milliradians (mrads). The aperture angle $\alpha$ and the beam divergence of the laser beam 5 are presented in an exaggerated fashion in FIG. 5B for elucidation purposes. The (virtual) focal position of the divergent laser beam 5 emerging from the adjustment device 15 in FIG. 5B is at a distance of approximately fifty meters from the fourth mirror 19 in the shown example. The divergence of the laser beam 5 is produced by reducing the distance between the third mirror 18 and the fourth mirror 19 in relation to the basic position. As described further above, the specific values for (half) the aperture angle $\alpha$ and for the (virtual) focal position of the emerging laser beam 5 depend on the employed focal lengths and the possible displacement paths of the movement device 20.

As a result of displacing the further housing 28 downward, the laser beam 5 impinges on the fourth mirror 19 with a smaller beam cross section than is the case in the basic position shown in FIGS. 2A and 2B. Accordingly, a nominal magnification of the laser beam 5 is produced in the position shown in FIGS. 5A and 5B, said nominal magnification having a scale which is less than the (nominal) magnification factor M in the basic position (i.e., d/d'<M applies). By displacing the common housing 24 in the direction of the first mirror 16, it is possible to increase the imaging scale, and so the latter once again corresponds to the nominal imaging scale M. In the case of such a displacement, the aperture angle $\alpha$ is further enlarged, which may be taken into account for setting the desired aperture angle $\alpha$.

By way of a movement of the further housing 28 along the further displacement axis 31*a* into an upper position of the further housing 28 (not presented pictorially), the movement device 20 can produce a convergent emerging laser beam 5, with the (half) aperture angle $\alpha$ of the convergent laser beam 5 likewise being of the order of a few milliradians. The focal position of the convergent laser beam 5 emerging from the adjustment device of FIG. 5B can, for example, likewise have a distance of approximately fifty meters from the fourth mirror 19.

The change in the imaging scale (d/d'>M) which occurs during the upward displacement of the further housing 28 can be compensated by virtue of increasing the distance between the second mirror 17 and the third mirror 18 relative to the first mirror 16, such that a convergent emerging laser beam 5 is produced with a beam diameter d, which corresponds to the nominal imaging scale (d/d'=M). The aperture angle $\alpha$ decreases slightly in the case of such a displacement.

In the case of the displacement of the further housing 28, the emerging laser beam 5 is offset in the Y-direction, i.e., the latter impinges with a lateral offset on the first deflection mirror 9 (cf. FIG. 1) which follows the adjustment device 15 in the beam guiding device 3. To compensate this beam offset, the first deflection mirror 9 and a further deflection mirror 10, following the latter in the beam path, may be embodied to be swivelable about a respective tilt axis extending in the Z-direction and/or to be displaceable in the Y-direction. The tilts and/or the displacements of the deflection mirrors 9, 10 are matched to one another in such a way that the laser beam 5 impinges on the subsequent deflection mirror 11 at the desired position (and parallel to the X-direction, i.e. aligned at the correct angle). It is understood that the compensation of the beam offset may, alternatively or additionally, also be carried out with the help of the further deflection mirrors 11, 12, or in any other way, so as to ensure that the laser beam 5 is focused onto the target position B as desired by the focusing lens 6.

Only small aberrations occur in the positions of the movement device 20 shown in FIGS. 3A and 3B to FIGS. 5A and 5B and in the position not presented pictorially, in which a convergent laser beam 5 is formed. Moreover, the energy distribution of the laser beam 5 is maintained over the beam cross section during the displacement of the second to fourth mirrors 17, 18, 19. The adjustment device 15 described herein, including the first mirror 16 and the fourth mirror 19, which are embodied as parabolic mirrors, and including the second mirror 17 and the third mirror 18, which are embodied as ellipsoid mirrors, moreover facilitates a particularly compact realization of the adjustment device 15, which is therefore particularly advantageous in view of the required installation space.

No intermediate focus is produced in the beam path between the four mirrors 16 to 19 in the adjustment device 15 shown in FIGS. 2A and 2B to FIGS. 5A and 5B, in which the reflecting surfaces 16*a*, 18*a* of the first mirror 16 and the third mirror 18 have convex curvature and in which the second reflecting surface 17*a* and the fourth reflecting surface 19*a* of the second mirror 17 and of the fourth mirror 19, respectively, have concave curvature. Alternatively, it is also possible to embody the adjustment device 15 in such a way that one, two or three intermediate foci are produced in the beam path between the individual mirrors 16 to 19, as described below in more detail on the basis of FIGS. 6A, 6B and 6C, which show the adjustment device 15, respectively, in the basic position, analogously to FIGS. 2A and 2B. In the illustrations shown in FIGS. 6A, 6B and 6C, the first mirror 16 and the fourth mirror 19 are embodied as off-axis paraboloid mirrors, as described further above, and the second mirror 17 and third mirror 18 are embodied as ellipsoid mirrors.

In the adjustment device 15 shown in FIG. 6A, the reflecting surfaces 17*a*, 18*a* of the second mirror 17 and third mirror 18 each have a concave curvature, while the reflecting surfaces 16*a*, 19*a* of the first mirror 16 and the fourth mirror 19 each have a convex curvature. In this way, an intermediate focus is produced between the second mirror 17 and third mirror 18. In the adjustment device 15 shown in FIG. 6B, the reflecting surface 16*a* of the first mirror 16 has a convex curvature, while the reflecting surfaces 17*a* to 19*a* of the second to fourth mirrors 17 to 19 each have a concave curvature, as a result of which a second intermediate focus is formed between the third mirror 18 and the fourth mirror 19. In the adjustment device 15 shown in FIG. 6C, the reflecting surfaces 16a to 19a of all four mirrors 16 to 19 each have a concave curvature, as a result of which a third intermediate focus is formed between the first mirror 16 and the second mirror 17. It is understood that the adjustment devices 15 shown in FIGS. 6A, 6B and 6C may be provided with a movement device 20 which is embodied in the manner described further above in order to set both the beam diameter d and the aperture angle α of the laser beam 5.

It is likewise understood that the movement device 20 may also have an embodiment that differs from the one shown in FIGS. 2A and 2B to FIGS. 6A, 6B and 6C. Also, the adjustment device 15 can be used to produce a nominal reduction in size of the laser beam 5 with a reduction scale 1/M by virtue of reversing the beam direction of the laser beam 5. The adjustment device 15 with the movement device 20 or the beam guiding device 3 can also be used in a meaningful manner in other optical arrangements than in the EUV radiation generating apparatus 1 that is described further above, in which other optical arrangements an adjustment of both the beam diameter d and the aperture angle α of a laser beam 5 is required, in particular in the case of optical arrangements which have a very long beam path or require very high powers. By way of example, such a beam guiding device 3 can be used in a laser processing machine for laser welding and/or laser cutting applications.

A number of embodiments of the invention have been described. Nevertheless, it will be understood that various modifications may be made without departing from the spirit and scope of the invention. Accordingly, other embodiments are within the scope of the following claims.

What is claimed is:

1. A beam guiding device for guiding a laser beam, comprising:
   an adjustment device configured to adjust a beam diameter and an aperture angle of the laser beam, wherein the adjustment device comprises:
   a first mirror having a first curved reflecting surface;
   a second mirror having a second curved reflecting surface;
   a third mirror having a third curved reflecting surface;
   a fourth mirror having a fourth curved reflecting surface; and
   a movement device configured to adjust the beam diameter and the aperture angle of the laser beam by moving the first reflecting surface and the fourth reflecting surface relative to one another and, independently thereof, moving the second reflecting surface and the third reflecting surface together relative to the first reflecting surface and the fourth reflecting surface.

2. The beam guiding device of claim 1, wherein the first reflecting surface and the third reflecting surface each have has a convex curvature, and
   wherein the second reflecting surface and the fourth reflecting surface each have has a concave curvature.

3. The beam guiding device of claim 1, wherein the second mirror and the third mirror are nonsymmetrical ellipsoid mirrors.

4. The beam guiding device of claim 1, wherein the first mirror and the fourth mirror are parabolic mirrors.

5. The beam guiding device of claim 1, wherein the movement device is configured to cause a relative movement between the first mirror and the fourth mirror that are moved from a basic position, in which a focal position of the first mirror corresponds to a first focal position of the second mirror, a second focal position of the second mirror corresponds to a first focal position of the third mirror, and a second focal position of the third mirror corresponds to a focal position of the fourth mirror.

6. The beam guiding device of claim 1, wherein the movement device is configured to cause a common displacement of the second mirror and third mirror along a common displacement axis.

7. The beam guiding device of claim 6, wherein a laser beam axis of the laser beam between the first mirror and the second mirror and a laser beam axis of the laser beam between the third mirror and the fourth mirror extend parallel to the common displacement axis.

8. The beam guiding device of claim 6, wherein the movement device is configured to displace at least one of the first mirror or the fourth mirror along a further displacement axis that extends parallel to the common displacement axis.

9. The beam guiding device of claim 1, wherein the second reflecting surface of the second mirror is arranged at a fixed distance from the third reflecting surface of the third mirror.

10. The beam guiding device of claim 9, wherein the second mirror and the third mirror are attached to a common carrier at the fixed distance from one another, and
    wherein the movement device is configured to move the common carrier for a common movement of the second mirror and the third mirror relative to the first mirror and the fourth mirror.

11. The beam guiding device of claim 10, wherein the common carrier comprises a common housing including a second opening for an entrance of the laser beam from the first mirror and a third opening for an exit of the laser beam to the fourth mirror.

12. The beam guiding device of claim 1, wherein the first mirror is arranged in a housing including a first opening for an exit of the laser beam to the second mirror, and
    wherein the fourth mirror is arranged in a further housing including a fourth opening for an entrance of the laser beam from the third mirror.

13. The beam guiding device of claim 12, wherein the movement device is configured to move the housing and the further housing relative to one another, such that the first reflecting surface and the fourth reflecting surface are moved relative to one another.

14. The beam guiding device of claim 1, wherein the adjustment device is configured to produce a Z-fold of the laser beam at the first mirror and at the second mirror.

15. The beam guiding device of claim 1, wherein the adjustment device is configured to produce a further Z-fold of the laser beam at the third mirror and at the fourth mirror.

16. The beam guiding device of claim 1, wherein the laser beam comprises a CO2 laser beam.

17. The beam guiding device of claim 1, wherein the first mirror, the second mirror, the third mirror, and the fourth mirror are arranged in succession in a beam path of the laser beam.

18. An extreme ultraviolet (EUV) radiation generating apparatus comprising:
    a beam generator for generating a laser beam;
    a vacuum chamber, into which a target material can be introduced in a target region of the vacuum chamber to produce EUV radiation; and
    a beam guiding device configured to guide the laser beam from the beam generator in a direction towards the target region, the beam guiding device comprising an adjustment device configured to adjust a beam diameter and an aperture angle of the laser beam, the adjustment device including:

a first mirror having a first curved reflecting surface;
a second mirror having a second curved reflecting surface;
a third mirror having a third curved reflecting surface;
a fourth mirror having a fourth curved reflecting surface; and
a movement device configured to move the first reflecting surface and the fourth reflecting surface relative to one another and, independently thereof, to move the second reflecting surface and the third reflecting surface together relative to the first reflecting surface and the fourth reflecting surface.

19. A method of adjusting a beam diameter and an aperture angle of a laser beam by a beam guiding device including a first mirror, a second mirror, a third mirror, and a fourth mirror arranged in succession in a beam path of the laser beam, the method including:
moving a first curved reflecting surface of the first mirror and a fourth curved reflecting surface of the fourth mirror relative to one another; and
moving a second curved reflecting surface of the second mirror and a third curved reflecting surface of the third mirror together relative to the first curved reflecting surface and the fourth curved reflecting surface, until a diameter and an aperture angle of the laser beam reach a predetermined beam diameter and a predetermined aperture angle, respectively.

20. The method of claim 19, wherein the moving of the first reflecting surface and the fourth reflecting surface relative to one another is independent from the moving of the second reflecting surface and the third reflecting surface together.

* * * * *